United States Patent [19]
Takada et al.

[11] Patent Number: 4,738,895
[45] Date of Patent: Apr. 19, 1988

[54] WOODY FIBER MAT

[75] Inventors: Minoru Takada; Hidetaka Oohori, both of Aizuwakamatsu; Takayoshi Nakajima, Yokohama, all of Japan

[73] Assignees: Chisso Corporation, Osaka; Kaihatsu-Board Corp., Fukushimaken, both of Japan

[21] Appl. No.: 8,333

[22] Filed: Jan. 29, 1987

[30] Foreign Application Priority Data

Feb. 18, 1986 [JP] Japan ................................. 61-33626

[51] Int. Cl.$^4$ ................................................ B32B 5/14
[52] U.S. Cl. .................................. 428/288; 156/62.2; 428/326; 428/373; 428/374
[58] Field of Search ............... 428/288, 326, 373, 374; 156/62.2

[56] References Cited

U.S. PATENT DOCUMENTS

| | | |
|---|---|---|
| 4,100,324 | 7/1978 | Anderson et al. ................... 428/326 |
| 4,474,846 | 10/1984 | Doerer ................................. 428/326 |
| 4,536,440 | 8/1985 | Berg ..................................... 428/373 |
| 4,555,430 | 11/1985 | Mays .................................... 428/373 |
| 4,590,114 | 5/1986 | Holtman ............................. 156/62.2 |

Primary Examiner—Paul J. Thibodeau
Attorney, Agent, or Firm—Fred Philpitt

[57] ABSTRACT

An improved woody fiber mat composed mainly of woody fibers, long fibers, thermoplastic fibers and a thermoset resin and moldable under heat and pressure into a product having a definite shape and very suitable to deep draw forming is provided, which mat is characterized in that the thermoplastic fibers are composite fibers composed of a plurality of components having different melting points; the fibers constituting the mat are entangled with each other and also subjected to melt adhesion and joining by a lower melting point component of the composite fibers; and the thermoset resin is in an uncured state.

8 Claims, No Drawings

WOODY FIBER MAT

BACKGROUND OF THE INVENTION

This invention relates to a molding mat composed mainly of woody fibers.

So far known molding mats using woody fibers as the main raw material thereof include a product obtained by blending long fibers and a thermoplastic or thermoset resin adhesive with woody fibers (see Japanese patent application laid-open No. Sho 51-43478/1976) and a product obtained by blending low melting point thermoplastic fibers and a thermoset resin with woody fibers and long fibers, followed by heat-treating the resulting blend at a temperature lower than the curing temperature of the thermoset resin to thereby stabilize the resulting material through melt adhesion of the thermoplastic resin fibers (see Japanese patent application laid-open No. Sho 59-120440/1984). According to the former process, since the structure of the mat is retained only by entanglement of the fibers, the resulting product has a low strength so that there are the drawbacks that breakage occurs during the carrying step at the time of molding or its fitting step to a mold, or tears are liable to occur in the molded product. According to the latter process, although the strength of the mat is improved to a certain extent, since the interfilamentary adhesion relies on dropwise molten thermoplastic fibers, it is impossible to make use of the strength of the thermoplastic fibers themselves so that there is the drawback that the distribution of the adhesion points is sparse and the resulting mat is still liable to cause tears at the time of molding, particularly at the time of deep drawing molding.

SUMMARY OF THE INVENTION

The present inventors have done extensive research in order to overcome the above-mentioned drawbacks of conventional woody fiber mats.

The present invention resides mainly in a woody fiber mat composed mainly of woody fibers, long fibers, thermoplastic fibers and a thermoset resin and moldable under heat and pressure into a product having a definite shape, which mat is characterized in that said thermoplastic fibers are composite fibers composed of a plurality of components having different melting points; the fibers constituting said mat are entangled with each other and also subjected to melt adhesion and joining by a lower melting point component of said composite fibers; and said thermoset resin is in an uncured state.

DETAILED DESCRIPTION OF PREFERRED EMBODIMENTS

The woody fibers used in the present invention refer to woody fibers obtained by cooking and pulping wood chips, pulp, regenerated pulp obtained by pulping waste paper, etc., and constiitute a main component of the woody fiber mat. The long fibers refer to vegetable fibers such as cotton, hemp, etc., animal fibers such as wool, synthetic fibers such as nylon, polyester, etc. and the like, and are suitably chosen from among those which are not deteriorated by heat applied at the time of heat treatment and molding for producing the mat as mentioned later, followed by cutting the fibers to a fiber length of 10 to 50 mm and blending the cut fibers with the above woody fibers for use. The woody fibers generally have a main fiber length as short as 1 to 2 mm, and by blending such fibers with the long fibers, it is possible to improve the moldability of the mat, and further, use of 10 parts by weight or more of the long fibers based on 100 parts by weight of the woody fibers is preferred.

The composite fibers used as the thermoplastic fibers in the present invention refer to fibers which consist of a plurality of components having different melting points and are fibers arranged in the form of side-by-side type, sheath-and-core type or island-in-sea type so that the lower melting point component of the fibers can occupy at least a portion of the fiber surface in the direction of the fiber length, and the melting point of the lower melting point component is lower than the curing temperature of the thermoset resin mentioned later. In the case where the difference of the melting point of the lower melting point component of the composite fibers from that of the other component(s) and the difference thereof from the curing temperature of the thermoset resin are both 20° C. or more, the heat treatment conditions for the mat production have a broad width; hence such a case is preferred. Examples of such preferred composite fibers are those wherein polyethylene, ethylene-vinyl acetate copolymer, low melting point polyester, etc. are used as the lower melting point component and polypropylene, polyester, polyamide, polyacrylonitrile, etc. are used as the other component(s) and both the components are arranged in the form of side-by-side type or a type wherein the lower melting point component is used as the sheath or sea component and the other component(s) are used as the core or island component. Among these, composite fibers wherein low density polyethylene, ethylene-vinyl acetate copolymer or composition composed mainly thereof having a melting point of 120° C. or lower is used as the lower melting point component and polypropylene is used as the other component(s), not only have a low melt adhesion temperature and a low cost of heat treatment for mat production, but also have a good compatibility of both the components with each other to thereby cause no peeling thereof; hence even when the fibers are added in a small quantity, the effectiveness of improving the mat strength is notable. Further, as such composite fibers, those having a thickness of 1 to 100 deniers, preferably 1.5 to 20 deniers and a length of 10 to 100 mm, preferably 25 to 50 mm may be used. If the thickness and length exceed the above upper limits, a uniform blending is difficult, while if they are less than the above lower limits, the effectiveness of improving the mat strength cannot be obtained. The blending proportion of composite fibers based on 100 parts by weight of the woody fibers is 3 parts by weight or more, preferably 5 parts by weight or more. If it is less than 3 parts by weight, the reinforcing effectiveness is insufficient. If it exceeds 20 parts by weight, no particular effectiveness is exhibited; hence such a proportion is uneconomical.

The thermoset resin used in the present invention is cured by the heat treatment carried out when the woody fiber mat of the present invention is press-molded into a molded product, and the resin may be suitably chosen for use from among known thermoset resins such as phenolic resins, urea resins, alkyd resins, etc. If the thermoset resin is in the form of powder, its blending with other mat-constituting materials i.e. the woody fibers, etc. is easy. If the resin is in the form of solution, uniform blending is effected by spraying. The blending proportion of the thermoset resin may be suitably chosen depending on the hardness and strength required for the resulting molded product, but the proportion is generally 5 to 30 parts by weight based on 100 parts by weight of the woody fibers.

To the woody fiber mat of the present invention may be added, besides the above four kinds of raw materials, water-resistant agent such as paraffin, pigment, filler, fire-retardant, etc., if desired.

The woody fibers and others as raw materials are blended and preliminarily formed into a mat having a desired width, thickness, length and basis weight, followed by subjecting the mat to heat treatment at the softening point or higher, preferably at the melting point or higher, of the lower melting point component of the composite fibers and also at a temperature lower than the melting point of the other component(s) of the composite fibers and lower than the curing temperature of the thermoset resin. At the time of the heat treatment, it is also possible, if desired, to compress the mat under pressure. Blending of the raw materials has no particular limitation, and any of carding machine, fleece-making machine, random webber, etc. may be employed. In the case where the woody fibers are fibers obtained by cooking and pulping wood chips, the fibers are blended in not yet dried state with the long fibers, composite fibers and powdery thermoset resin, whereby it is possible to prevent the thermoset resin powder from slipping-off loss, and further it is also possible to dry the woody fibers at the time of the above heat treatment; hence the above blending manner is economically preferred.

The lower melting point component of the composite fibers softened or melted at the time of the heat treatment does not form any dropwise aggregate, but it is broadly developed over the other component(s) of the composite fibers while the fiber shape is retained; hence the composite fibers cause meltadhesion not only with each other, but also with the woody fibers and long fibers at many contact points, and also, after the heat treatment, the composite fibers intervene between these contact points to connect these together. Thus the resulting mat has a high strength and a superior elasticity, and it is possible to prevent its breakage when it is carried. Further, since the adhesive points by means of the composite fibers are softened or melted by heating at the time of molding, the constitution of the mat becomes loose to make it possible to unforcedly absorb the tension afforded by the mold, and also in the case of deep-drawing molding, neither thickness unevenness nor cracking occurs.

The woody fiber mat of the present invention is useful as a raw material for parts or goods in various fields, obtained by molding under pressure and heat and needing a complicated and steric shape and a considerable hardness, such as door panel for automobile, tray for packaging, furniture, case for musical instruments, etc.

The present invention will be described in more detail by way of Examples and Comparative examples.

EXAMPLES 1 and 2 and Comparative examples 1, 2, 3 and 4

Wood chips of a conifer were cooked and pulped, and steam was separated from the resulting material to obtain woody fibers having a length of 3 mm and a water content of 45% by weight. Hemp cut to a fiber length of 40 mm was used as the long fibers. As the thermoplastic fibers, polypropylene/low density polyethylene side-by-side type composite fibers (composite ratio: 50/50, thickness: 3d, length: 38 mm), low density polyethylene fibers (thickness: 3d, length: 38 mm) and polypropylene fibers (thickness: 3d, length: 38 mm) were used. As the thermoset resin, powdery phenolic resin was used.

The above-mentioned raw materials were sufficiently blended in blending ratios indicated in Table 1, followed by loading the blend onto a mat-making apparatus to form a mat of 50 mm thick, which was then heated in a hot air-circulating drying oven at 120° C. for 3 minutes and then compressed by means of rolls so as to give a thickness of 20 mm to obtain a woody fiber mat. In addition, only in the case of Comparative example 4, heating was carried out at 160° C. The blending ratios indicated in Table 1 are expressed in terms of parts by weight on the dry basis.

The above-mentioned woody fiber mat was heat-compressed at a temperature of 220° C., under a pressure of 20 Kg/cm$^2$ for one minute, using a mold for producing a door interior panel for automobile, having a length of 1,100 mm, a width of 800 mm and a thickness of 20 mm and at its central part, an armrest part having a length of 500 mm, a width of 100 mm and a depth of 70 mm, to carry out deep-drawing molding. The evaluation results are also shown in Table 1. The evaluation methods are described below.

Mat breakage: When a mat of 1,100 mm long, 800 mm wide and 20 mm thick is transferred onto a mold by hands, that which causes breakage is designated as x; that which causes deformation, as Δ; and that which causes neither breakage nor deformation as O.

Cracking of molded product: When a molded product is observed, that which has fissures or cracks is designated as x and that which is good, as O.

Wrinkle of molded product: When a molded product is observed, that which has wrinkles is designated as x and that which is good, as O.

Hardness of molded product: That which has a flexural strength of 300 Kg/cm$^2$ or higher is designated as O; that which has a flexural strength of 100 Kg/cm$^2$ or lower, as x; and that which has a flexural strength of an intermediate value therebetween, as Δ.

Collective evaluation: A product which is judged to be excellent as a woody fiber mat for deep-drawing molding is designated as O and a product which is judged to be not excellent, as x.

TABLE 1

| | Composition of woody fiber mat (parts by weight) | | | | Evaluation | | | | |
|---|---|---|---|---|---|---|---|---|---|
| | Woody fibers | Long fibers | Thermoplastic fibers | Thermoset resin | Breakage | Crack | Wrinkle | Hardness | Collective |
| Example 1 | 75 | 20 | PP/PE 5 | 7 | O | O | O | O | O |
| Example 2 | 70 | 20 | PP/PE 10 | 7 | O | O | O | O | O |
| Comp. ex. 1 | 70 | 20 | PP/PE 10 | 0 | O | O | O | X | X |
| Comp. ex. 2 | 80 | 20 | — | 7 | X | X | O | O | X |

TABLE 1-continued

| | Composition of woody fiber mat (parts by weight) | | | | Evaluation | | | | |
|---|---|---|---|---|---|---|---|---|---|
| | Woody fibers | Long fibers | Thermoplastic fibers | Thermoset resin | Break-age | Crack | Wrin-kle | Hard-ness | Collec-tive |
| Comp. ex. 3 | 70 | 20 | PE 10 | 7 | Δ | X | O | O | X |
| Comp. ex. 4 | 70 | 20 | PP 10 | 7 | Δ | X | O | O | X |

PP: Polypropylene
PE: Polyethylene

As shown in Table 1, the woody fiber mats satisfying the requirements of the present invention were very suitable to deep draw forming.

EXAMPLES 3, 4 AND 5 AND COMPARATIVE EXAMPLES 5 AND 6

Woody fiber mats were prepared in the same manner as in the above Examples except that as the thermoplastic fibers were used polyester/low melting polyester sheath-and-core type composite fibers (composite ratio: 50:50, thickness: 5d, length: 40 mm), polyamide/ethylenevinyl acetate copolymer sheath-and-core type composite fibers(composite ratio: 50/50, thickness: 5d, length: 40 mm), polyester/low density polyethylene sheath-and-core type composite fibers (composite ratio: 50:50, thickness: 5d, length: 40 mm), low melting polyester fibers (thickness: 5d, length: 40 mm) and polyamide fibers (thickness: 5d, length: 40 mm). The compositions of the resulting woody fiber mats and the results are shown in Table 2.

As shown in Table 2, the woody fiber mats satisfying the requirements of the present invention were very suitable to deep draw forming.

TABLE 2

| | Composition of woody fiber mat (parts by weight) | | | | Evaluation | | | | |
|---|---|---|---|---|---|---|---|---|---|
| | Woody fibers | Long fibers | Thermoplastic fibers | Thermoset resin | Break-age | Crack | Wrin-kle | Hard-ness | Collec-tive |
| Example 3 | 75 | 20 | PET/LPES 5 | 7 | O | O | O | O | O |
| Example 4 | 75 | 20 | PAM/EVA 5 | 7 | O | O | O | O | O |
| Example 5 | 75 | 20 | PET/PE | 7 | O | O | O | O | O |
| Comp. ex. 5 | 75 | 20 | LPET 5 | 7 | Δ | X | O | O | X |
| Comp. ex. 6 | 75 | 20 | PAM 5 | 7 | X | X | O | O | X |

PET: Polyester, LPET: Low melting point polyester
PAM: Polyamide, EVA: Ethylene vinyl acetate resin

What we claim is:

1. A woody fiber mat composed mainly of woody fibers, long fibers having a length of 10 to 50 mm., thermoplastic fibers and a thermoset resin and moldable under heat and pressure into a product having a definite shape, which mat is characterized in that said thermoplastic fibers are composite fibers composed of a plurality of components having different melting points and having a thickness of 1 to 10 deniers and a length of 10 to 100 mm.; the fibers constituting said mat are entangled with each other and also subjected to melt adhesion and joining by a lower melting point component of said composite fibers; and said thermoset resin is in an uncured state.

2. A woody fiber mat according to claim 1 wherein the lower melting point component of said composite fibers is low density polyethylene or ethylene-vinyl acetate copolymer or a composition composed mainly thereof and having a melting point of 120° C. or lower and another component thereof is polypropylene.

3. A woody fiber mat according to claim 1 wherein said composite fibers have a thickness of 1.5 to 20 deniers and a length of 25 to 50 mm.

4. A woody fiber mat according to claim 1 wherein the blending proportion of said composite fibers based on 100 parts by weight of said woody fibers is in the range of 5 to 20 parts by weight.

5. An entangled fiber mat comprising a combination of
   (a) woody fibers,
   (b) long fibers,
   (c) a thermoset resin in an uncured state, and
   (d) composite thermoplastic fibers having a length of 10 to 50 mm. that are selected from the group consisting of side-by-side type fibers, sheath-and core type fibers and island-in-sea type fibers that are each made up of thermoplastic components having different melting points and which have a thickness of 1 to 200 deniers and a length of 10 to 100 mm., said entangled fiber mat including fibers that are joined to composite fibers at their point of contact with the lower melting point component of said composite fibers after the temperature of said composite fibers have been raised above the melting point of said lower melting point component of said composite fibers.

6. A fiber mat according to claim 5 wherein the lower melting point component of said composite fibers is low density polyethylene, ethylene-vinyl acetate copolymer or a composition composed mainly thereof and having a melting point of 120° C. or lower and another component of said composite fibers is polypropylene.

7. A fiber mat according to claim 5 wherein said composite fibers have a thickness of 1.5 to 20 deniers and a length of 25 to 50 mm.

8. A fiber mat according to claim 5 wherein the blending porportion of said composite fibers based on 100 parts by weight of said woody fibers is in the range of 5 to 20 parts by weight.

* * * * *